A. R. WARNER.
METHOD OF PURIFYING NITROUS OXID.
APPLICATION FILED NOV. 6, 1914.
1,315,354.
Patented Sept. 9, 1919.
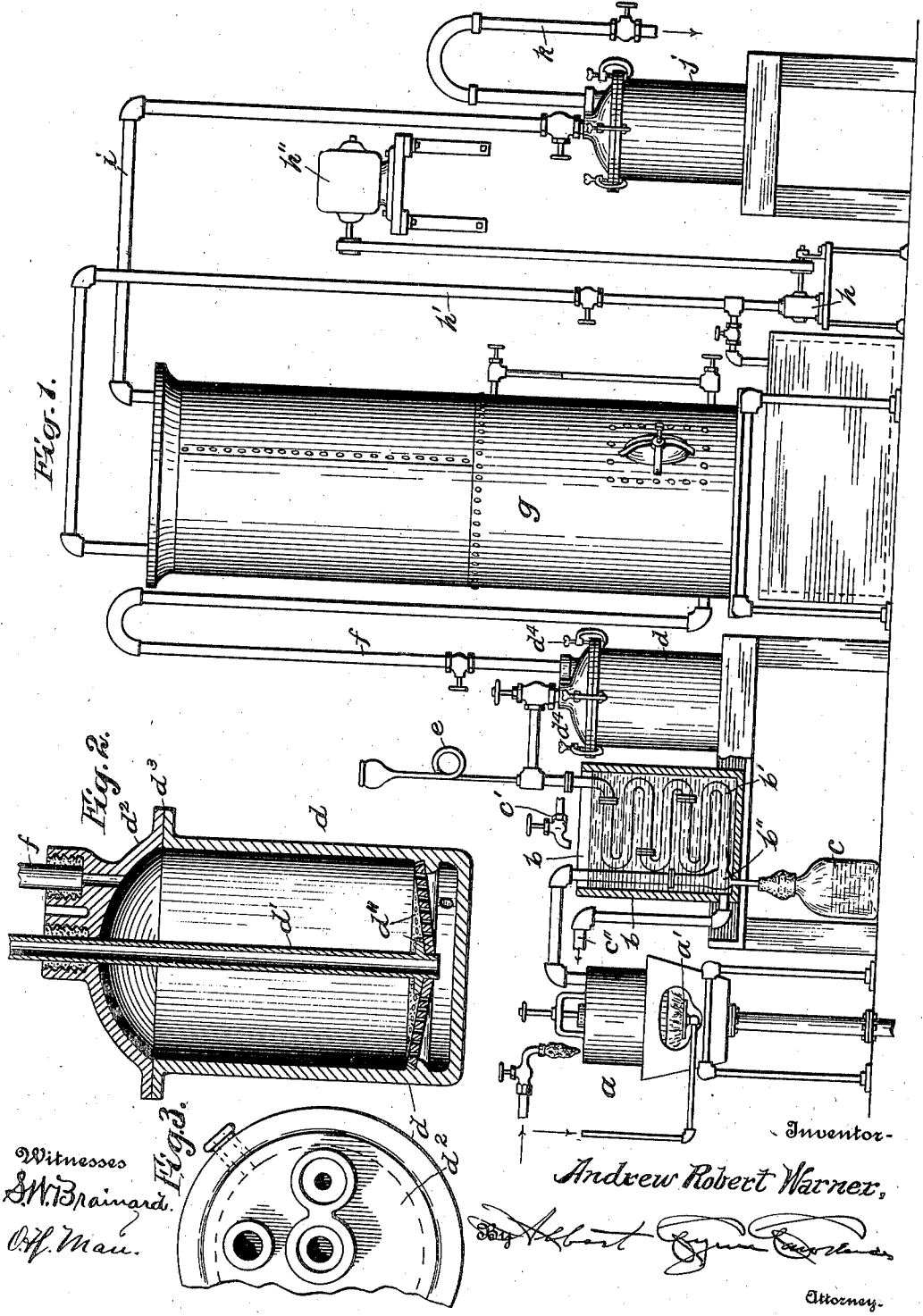

UNITED STATES PATENT OFFICE.

ANDREW ROBERT WARNER, OF CLEVELAND, OHIO, ASSIGNOR TO LAKESIDE HOSPITAL, OF CLEVELAND, OHIO, A CORPORATION OF OHIO.

METHOD OF PURIFYING NITROUS OXID.

1,315,354.  Specification of Letters Patent.  Patented Sept. 9, 1919.

Application filed November 6, 1914. Serial No. 870,708.

*To all whom it may concern:*

Be it known that ANDREW ROBERT WARNER, a citizen of the United States of America, residing at Cleveland, in the county of Cuyahoga and State of Ohio, has invented certain new and useful Improvements in Methods of Purifying Nitrous Oxid, of which the following is a specification.

My invention relates to an improved method of purifying nitrous oxid, and has for its object the production of a gaseous anesthetizing reagent, which is practically free from any impurities injurious to a patient.

Those professionally acquainted with the properties of nitrous oxid as commonly marketed, have been aware that the use of this anesthetic all too frequently was attended by serious and sometimes fatal results. Almost invariably such disastrous results could be traced to the presence of impurities in the gas, quite apart from the nitric oxid which initially is sometimes present.

Accordingly, I have devoted much care and experiment, to the end that any unwholesome impurities may be eliminated from nitrous oxid produced in commercial quantities. The common impurities, although slight, possess both acid and alkaline reactions, and the bulk of these impurities I have succeeded in eliminating by initially cooling the gases driven off in the heating retort. Next, the said gases are treated by solutions of potassium permanganate and then of sodium hydrate at normal or approximately atmospheric temperatures, after which the final impurities are removed by washing through sulfuric acid. Although a trace of nitric oxid sometimes is discernible initially, this impurity disappears upon permitting the resulting gas to stand for a period of forty-eight hours, in an iron or other metallic container.

Having the essentials of my improved process in mind from the foregoing brief description thereof, I may now explain the same, together with the preferred apparatus for manufacturing the gas in quantities suitable for hospital use, by making reference to the accompanying drawings, wherein:—

Figure 1, is a view in side elevation, fragmentally broken away or in section, for the purpose of indicating details of the apparatus employed by me for practising my invention.

Fig. 2, is a vertical sectional view upon a larger scale, of a wash bottle preferably formed of stone-ware, which I employ in practising my invention, and Fig. 3, is a plan view of said wash bottle partially broken away. Throughout the several figures of the drawings I have employed the same character of reference to indicate similar parts.

The retort $a$ is supplied with a gas burner $a'$, which retort upon being heated to approximately 250° C., with its charge of ammonium nitrate, is adapted to produce impure nitrous oxid. Preferably, I employ aluminum for manufacturing the retort and its connections through which the heated gases pass. Initially, these gases pass into a condenser $b$ equipped with an aluminum worm $b'$ and a trap $b''$ at its lowest point; said trap being connected with a sealed flask $c$. Cold water is supplied from the tap $c'$ and wastes from the bottom of the condenser through the pipe $c''$, so that the gases pass successively through colder portions of the worm into the wash bottle $d$. A manometer $e$ is provided at the discharge end of the worm or cooling coil $b'$. The cooled gases passing into the wash bottle $d$ are directed by a pipe $d'$ beneath a perforated diaphragm $d''$ of inverted conical shape. The numerous perforations in said diaphragm, as the device is shown in Fig. 2, will serve to subdivide minutely the flow of gas which is subjected to the action of an acidulated solution of potassium permanganate in said wash bottle $d$. The cover $d^2$ is provided with a ground joint $d^3$ adapted to be sealed upon the wash bottle by means of external clamps $d^4$. A pipe $f$ leads from the top of said wash bottle to the bottom of a coke-filled tower $g$ through which there is constantly directed a solution of sodium hydrate of about 10% strength, by means of a rotary pump $h$ connecting with a pipe $h'$ and driven by an electric motor $h''$.

Apparently certain alkaline impurities persist or are carried over from the tower, and accordingly the gas is taken by pipe $i$ from the top of the tower and directed through a second wash bottle $j$ which contains a 20% solution of sulfuric acid. This wash bottle is identical in construction with the wash bottle *d* already described, and the acid content thereof is adapted to eliminate any remaining impurities in the nitrous oxid, with the possible exception of an occasional trace of nitric oxid. This, as stated, may be readily safeguarded by storing the gas in an iron or other suitable metal container for twenty four hours. Accordingly, the gas is conducted by pipe *k* from said wash bottle *j* to a gasometer or to compressing apparatus, if desired. In "*Anoci-Association*" published July, 1914, I have shown and briefly described apparatus for practising my improved method of producing nitrous oxid and have set forth storing and compressing apparatus suitable for hospital use, in connection therewith. The necessary controlling valves, as indicated in my drawing are provided, but require no specific explanation herein.

From the foregoing, it will be appreciated that instead of subjecting the heated gases to any initial reaction, I preferably cool the product from the retort immediately, by a reverse flow of water, which is found to condense in the condensing and cooling coil or worm, some 45% of the product as water containing many impurities of acid and alkaline nature. These are trapped at the bottom of the worm and retained in the flask *c*. The washing in a cold permanganate solution and in sub-divided form serves more effectually to free the gas from impurities than if the gas were in heated condition. Furthermore, I am inclined to believe that a better reaction is obtained in the sodium hydrate tower when the gases are introduced at normal temperature. The final subjection of the gas, again in finely subdivided form in the sulfuric acid wash bottle, of course is also at normal temperature, and as stated above, serves to produce a practically pure nitrous oxid best adapted for use as an anesthetic by removing the alkaline impurities such as ammonia, hydrazins, hydroxylamins, and other basic substances known as tissue poisons.

After long continued use of the purified gas thus produced, no undesirable results have been observed through the presence of impurities, and as a consequence the product may invariably be depended upon where a gaseous anesthetic is indicated.

It will be understood that when a plant is depended upon for daily production of this anesthetic, it is very desirable to duplicate the same, if possible, in order to avoid the danger from shutting down for any necessary repairs. Also, it is quite apparent that any suitable storing or condensing apparatus may be associated with my improved plant herein shown, for subsequently handling the gas produced.

Having now explained the preferred process and apparatus for producing nitrous oxid, I claim as new, and desire to secure by Letters Patent, the following:—

1. The herein described process of purifying nitrous oxid, which consists in cooling the commercially produced product approximately to atmospheric temperature, subjecting the cooled gas to the action of solutions of potassium permanganate and sodium hydrate and to dilute sulfuric acid as a final purifying measure, substantially as set forth.

2. The herein described process of purifying nitrous oxid, which consists in cooling the commercially produced product approximately to atmospheric temperature, subjecting the cooled gas to the action of solutions of potassium permanganate and sodium hydrate, and in minutely sub-divided form to dilute sulfuric acid as a final purifying measure, substantially as set forth.

In testimony whereof I affix my signature in the presence of two witnesses.

ANDREW ROBERT WARNER.

Witnesses:
VIOLA P. REIBER,
ALBERT EUGENE LAWRENCE.